(12) United States Patent
Merrill

(10) Patent No.: US 6,173,417 B1
(45) Date of Patent: *Jan. 9, 2001

(54) INITIALIZING AND RESTARTING OPERATING SYSTEMS

(75) Inventor: John W. Merrill, Gilbert, AZ (US)

(73) Assignee: Intel Corporation, Santa Clara, CA (US)

( * ) Notice: Under 35 U.S.C. 154(b), the term of this patent shall be extended for 0 days.

This patent is subject to a terminal disclaimer.

(21) Appl. No.: 09/070,419

(22) Filed: Apr. 30, 1998

(51) Int. Cl.[7] .............................. G06F 9/24; G06F 11/07
(52) U.S. Cl. .............................. 714/15; 709/324; 717/11; 370/216; 713/100
(58) Field of Search ................................. 714/15, 16, 13, 714/47, 48, 20; 713/2, 1, 100; 717/11; 370/216; 709/321, 324, 327

(56) References Cited

U.S. PATENT DOCUMENTS

| 5,089,958 |   | 2/1992  | Horton et al.      |         |
|-----------|---|---------|--------------------|---------|
| 5,325,532 |   | 6/1994  | Crosswy et al.     |         |
| 5,504,905 | * | 4/1996  | Cleary et al.      | 713/100 |
| 5,696,897 | * | 12/1997 | Dong               | 714/15  |
| 5,710,930 | * | 1/1998  | Laney et al.       | 713/300 |
| 5,752,032 | * | 5/1998  | Keller et al.      | 709/311 |
| 5,864,657 | * | 1/1999  | Stiffler           | 714/15  |
| 5,956,507 | * | 9/1999  | Shearer, Jr. et al.| 709/104 |
| 5,991,544 | * | 11/1999 | Godse              | 717/11  |
| 6,098,158 | * | 8/2000  | Lay et al.         | 711/162 |
| 6,101,601 | * | 8/2000  | Matthews           | 713/2   |

FOREIGN PATENT DOCUMENTS

| 0 474 058 A2 | 3/1992  | (EP) . |
| 0 516 159 A2 | 12/1992 | (EP) . |
| 0 838 753 A1 | 4/1998  | (EP) . |
| WO 98/12635  | 3/1998  | (WO) . |

OTHER PUBLICATIONS

Peschel, "Artisoft's Configsage tracks Windows configuration", InfoWorld, p. 108, Aug. 1997.*
Cowart, "Mastering Windows 3.1", Sybex, Special Edition, 1992.*
IBM Technical Disclosure Bulletin, *Fast DOS Soft Boot*, Feb. 1, 1994, vol. 37, No. 2B, pp. 185–186.
Dynamic Software Reconfiguration Using System Management Mode; Fall 1995; Embedded Systems Conference.

* cited by examiner

*Primary Examiner*—Robert W. Beausoliel, Jr.
*Assistant Examiner*—Christopher Revak
(74) *Attorney, Agent, or Firm*—Trop, Pruner & Hu, P.C.

(57) ABSTRACT

An operating system may be more efficiently initiated and restarted by making a virtual image of the configuration settings for a base system configuration. These settings may be stored and may be used to quickly initiate the system in its base configuration, for example, using an executive. The base configuration may be automatically modified in response to system hardware or software configuration changes. These changes may be stored with the base configuration information. When a crash occurs, the virtual image may be used to quickly restore the system without the necessity for rebooting the operating system.

21 Claims, 9 Drawing Sheets

INITIALIZING AND RESTARTING OPERATING SYSTEMS

BACKGROUND

This invention relates generally to operating systems and particularly to initializing and restarting those operating systems, for example, after power is initially turned on or after a crash has occurred.

When a computer system is initially turned on, a basic input/output system or "BIOS" begins to operate. The BIOS controls many important functions of the personal computer, such as how it interprets key strokes, how it puts characters on the screen, and how it communicates with other devices. The BIOS typically instructs the computer to test itself every time the user turns the computer on. To do this, the BIOS uses a power on self test or "POST".

When the personal computer starts, it typically first enters what is called the "real mode". The computer accesses a special memory location holding program instructions including a jump instruction pointing to the BIOS code. Initially, the BIOS instructs the system microprocessor to run through components of the system and determine whether they are operating properly. Next, any expansion boards which have been installed are checked, and thereafter, the microprocessor begins the actual bootup process. During the bootup process, the BIOS code may instruct the microprocessor to jump to a section of code instructing the microprocessor how to read the first sector of the system floppy, hard disk or CD-ROM drive. The microprocessor then loads the operating system to start actual computer operations.

The Windows® operating system is perhaps the most common operating system used in personal computers. It is an "open" system in that it is adaptable to different computer systems and it is adaptable to changing hardware on any given computer system. At least, in part, due to this openness, it takes a considerable amount of time for the Windows® operating system to start up. To some users, this delay may be an annoyance and, in some instances, the start up process may interfere with the way a system operates.

For example, set top personal computers are personal computers associated with television systems which combine television capabilities, both analog and digital, and computer capabilities, such as internet access. It is expected that users of set top personal computers will consider those computers to be akin to normal electronic appliances. Thus, the users may not be willing to accommodate delays in initiation or error messages on their television screens. For example, a user might simultaneously, in a picture-within-picture system, play a game running on the Windows® operating system and simultaneously watch television. If the game were to crash, an error message could appear on the screen which would interfere with normal television viewing and at least for a short period, the television picture would be affected by the computer crash.

In substantially all cases, users would benefit by a quicker initiation of program operations. This could occur in at least three areas. Initially, when the computer turns on, it would be desirable to begin operations as quickly as possible. Secondly, when a program error or crash occurs, it would be desirable to restart the computer as soon as possible. Similarly, when a variety of issues come up during the course of computer operation, some users may desire to simply restart the computer to avoid dealing with and identifying the source of the problem.

Current computer systems have some capabilities to speed the initiation of the computer system. For example, it is known to use a "fast on" capability which bypasses all or part of the POST routine. Similarly, some laptop computers have a suspend/resume operation. When desired, the user can press a suspend button and all the settings on the computer are stored. When the computer powers up thereafter, the computer recognizes that a suspend had occurred and immediately resumes operations exactly where the computer left off before. In addition, some computer systems work in an "always on" mode whereby it is never necessary, absent a problem, to reboot the computer system. For example, Windows® 98 will have an Advanced Configuration and Power Interface (ACPI) function which is akin to a computer system which is never turned off. Some simple computer systems, such as personal data assistants (PDAs), use what is known as a Real Time Operating System (RTOS) to allow the computer to start quickly.

None of the techniques described above help when a program has crashed. In each of these cases at least a substantial part of the startup operation must be re-done after a crash. This can result in substantial delay and it is an impediment to creating a seamless appearance to the system user. Thus, there is a continuing need for methods that enable operating systems to initiate and restart more quickly, for example, after a crash or when initially turned on particularly with open operating systems. Similarly in connection with specialized computer systems, such as a set top personal computer, it would be desirable make normal computer operations invisible to the user.

SUMMARY

In accordance with one aspect of the present invention, a method for preventing a system failure includes developing an image for an operating system adapted to a specific configuration. The image is then stored. Upon detection of a program failure, the image is loaded into system memory.

DETAILED DESCRIPTION

Figure 1:
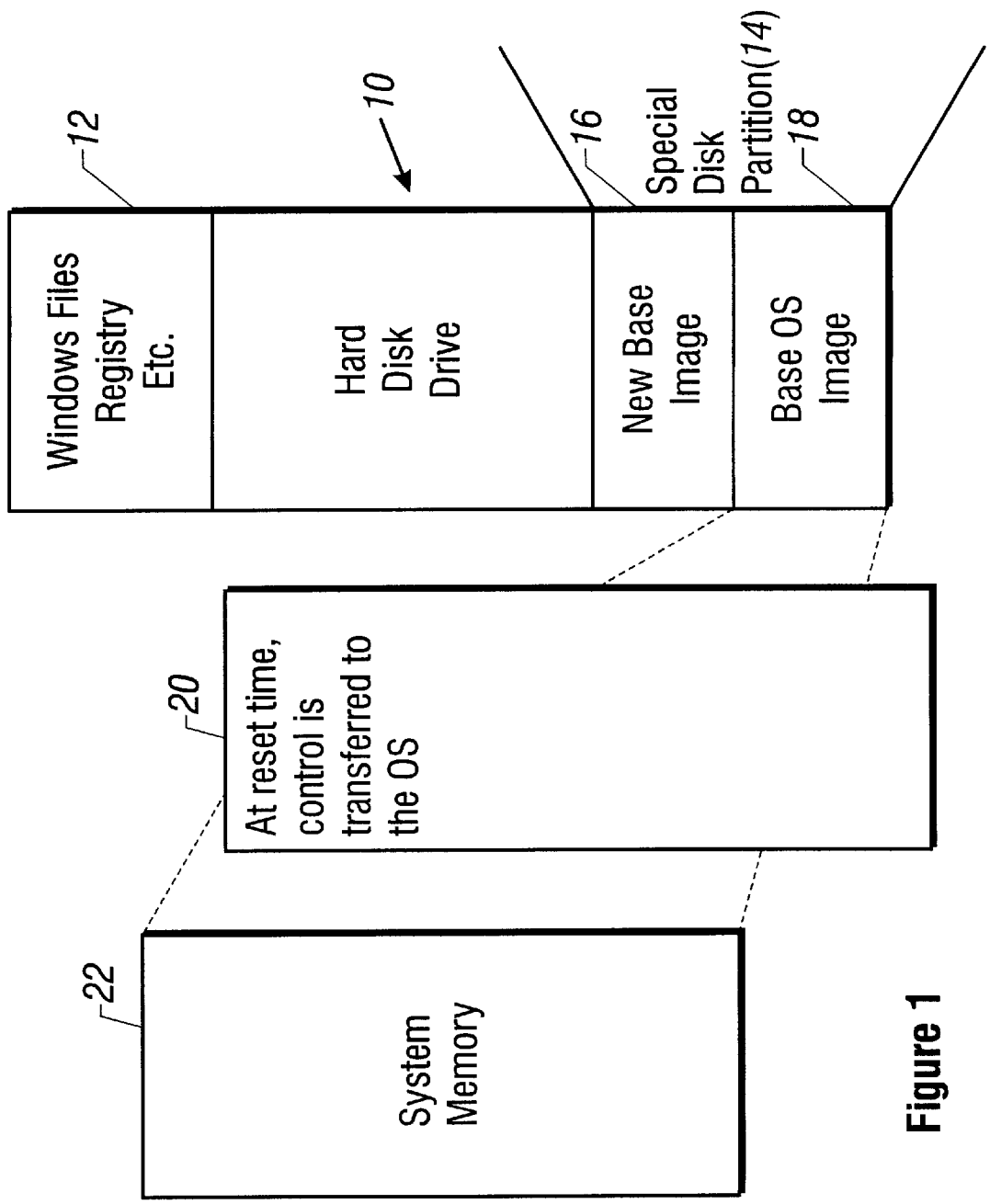
FIG. 1 is a diagrammatic depiction of one embodiment of the present invention.

Referring to FIG. 1, a hard disk drive 10, may store a number of files for an operating system such as the Windows® operating system. Typical files 12 would be user files, registry files and other operating system files. A special disk partition 14 provides an area for a new base image 16 and a base operating system image 18.

The base operating system image 18 may be a stored virtual image which may have been preloaded at an originating computer manufacturing facility. The image captures a system configuration for a base computer system with a predefined, set of hardware and software configuration parameters. These parameters may be applicable to a particular computer as it is originally configured or it may be a hypothetical set of configurations which may or may not correspond precisely to the configuration of the computer. The base operating system image 18 may, for example, include initial register settings, device settings, base memory page files and the like. In short, it includes everything that is loaded into memory at run time including dedicated applications and a user shell.

Basically, the image includes all the necessary parameters for an operating system, such as the Windows® operating system, to operate an actual or hypothetical computer configuration. It corresponds to the information about the registers and memory which is developed during the operating system bootup sequence for the predefined base computer configuration. Thus, the image is effectively a virtual image of the operating system after bootup with the predefined characteristics, analogous to a configuration snapshot. The image 18 includes information about the memory and registers of an actual or hypothetical base machine after bootup time.

At startup, the information contained in the special disk partition 14 is transferred, as indicated by block 20, into system memory 22. In this way, it is not necessary to undergo the normal operating system bootup operation, because that function has, in effect, been preaccomplished for the base configuration. As a result, it is possible to more quickly begin the operating system operation.

Particularly with open operating systems such as the Windows® operating system, the bootup time may be substantial because of the number of configurations that must be investigated and recorded. In one illustrative embodiment, the file associated with the virtual image may be a relatively large file. For example, in a system with a large number of different hardware and software configuration settings, the image may have a relatively large amount of data. Therefore, it may desirable to use very low level functions to encode the file which may be read very quickly. Thus, the initiation time for a system such as the Windows® operating system may be reduced from a time period on the order of a minute or so to a time on the order of seconds with current transfer rates from hard disks.

An example of the operation of one illustrative embodiment could involve a set top personal computer operating a television tuner and a video game in a screen within a screen display. If it becomes necessary to restart the system, it would be desirable for the transition to occur seamlessly. Namely, it would be desirable that the system restart without the user noticing a significant change in either the video game or the television picture.

By transferring an image of the operating system to system memory quickly, and obtaining current settings, both displays could be maintained. The current setting information might include the applications (e.g., the video game, the score in the game, the television tuner, and the channel setting).

This image could be loaded much more quickly than would be required to restart an open operating system for the computer. By transferring the image and the software to implement the image, the system can be started quickly without interfering in a significant way in the user's expectations.

Referring again to FIG. 1, the special disk partition 14 also includes a new base image 16. The image 16 may be recorded after the computer system software or hardware configuration changes. The computer system may be adapted to automatically store these changes in the memory space 16 so that whenever it is necessary to restart or reinitialize the operating system, the operating system can be quickly re-initialized, taking into consideration the new software and hardware configuration.

This approach is substantially different from that used in current open operating systems. Because these systems are open systems, they begin by querying all the settings and configurations each time the system is restarted or reinitiated. This takes some time but insures that a large number of variations can be accounted for without requiring different operating systems for different circumstances. The approach shown in FIG. 1 works in essentially the opposite fashion. It records an initial virtual image and then readjusts that image as necessary thereafter. In effect, it makes an assumption about a base configuration, records that image to avoid the need for an elaborate bootup sequence, and then modifies that image as necessary as the computer system evolves.

Figure 2:
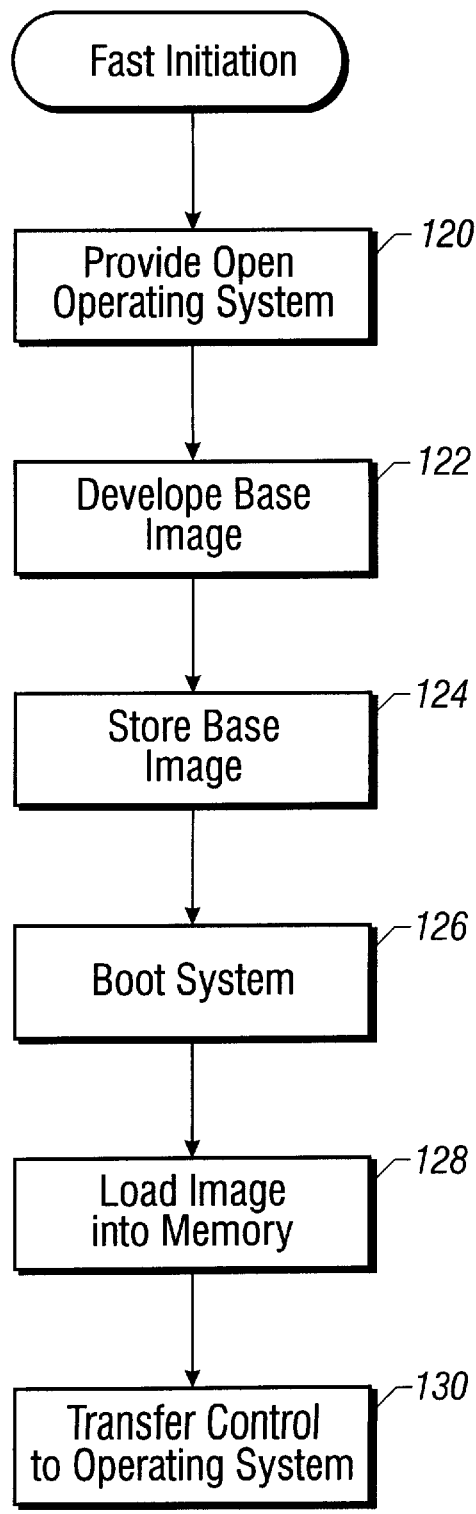
FIG. 2 is a flow diagram for a fast initiation program.

An exemplary flow for a fast initiation program, shown in FIG. 2, begins by providing an open operating system, as indicated at block 120. Thereafter, a base image is developed as described herein and the base image is stored, as shown in blocks 122 and 124. After the system has booted (block 126), the image is loaded into memory (block 128). Control is then transferred to the operating system, as indicated at block 130.

Figure 3:
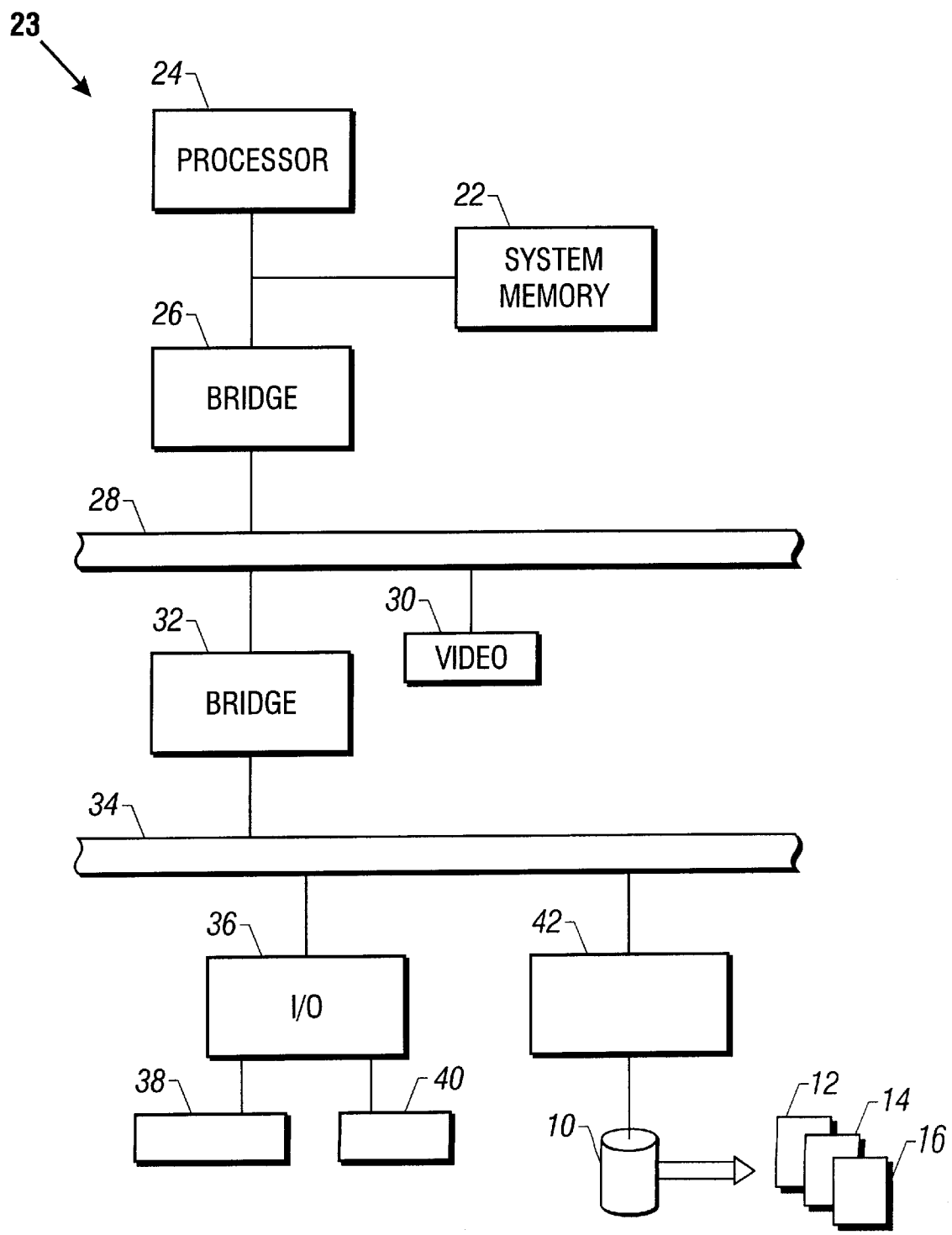
FIG. 3 is a block diagram showing the computer system which could implement the embodiment of the present invention shown in FIG. 1.

An exemplary computer system 23, shown in FIG. 3, includes a processor 24 connected to system memory 22. The processor 24 and system memory 22 may be connected by a bridge 26 to a bus 28. The bus 28 may be any conventional bus used in computer systems including the Peripheral Component Interconnect (PCI) bus. In the illustrated embodiment, video devices 30, such as a TV tuner or a monitor, may be connected to the bus 28. A second bridge 32 is also connected between the bus 28 and another bus 34. The bus 34 may be a conventional Extended Industry System Architecture (EISA) bus or any other conventional bus. In the illustrated embodiment, an input/output interface 36 connects to the bus 34 and to a mouse 40 and keyboard 38. Similarly, an interface 42 connects a hard drive 10 containing the files 12, 16 and 18 described previously.

Other computer systems may be initiated or restarted using the images 16 and 18, including those utilized as set top personal computers. Those devices could have the same general configuration described above, but might have devices for providing more video functions 30, for example. The set top personal computers include a modem for internet connections, and accept a bus such as a Universal Serial Bus (USB), for connecting desirable peripherals such as a keyboard, floppy or CD-ROM drives and the like. They conventionally use a television set as a monitor.

Figure 4:
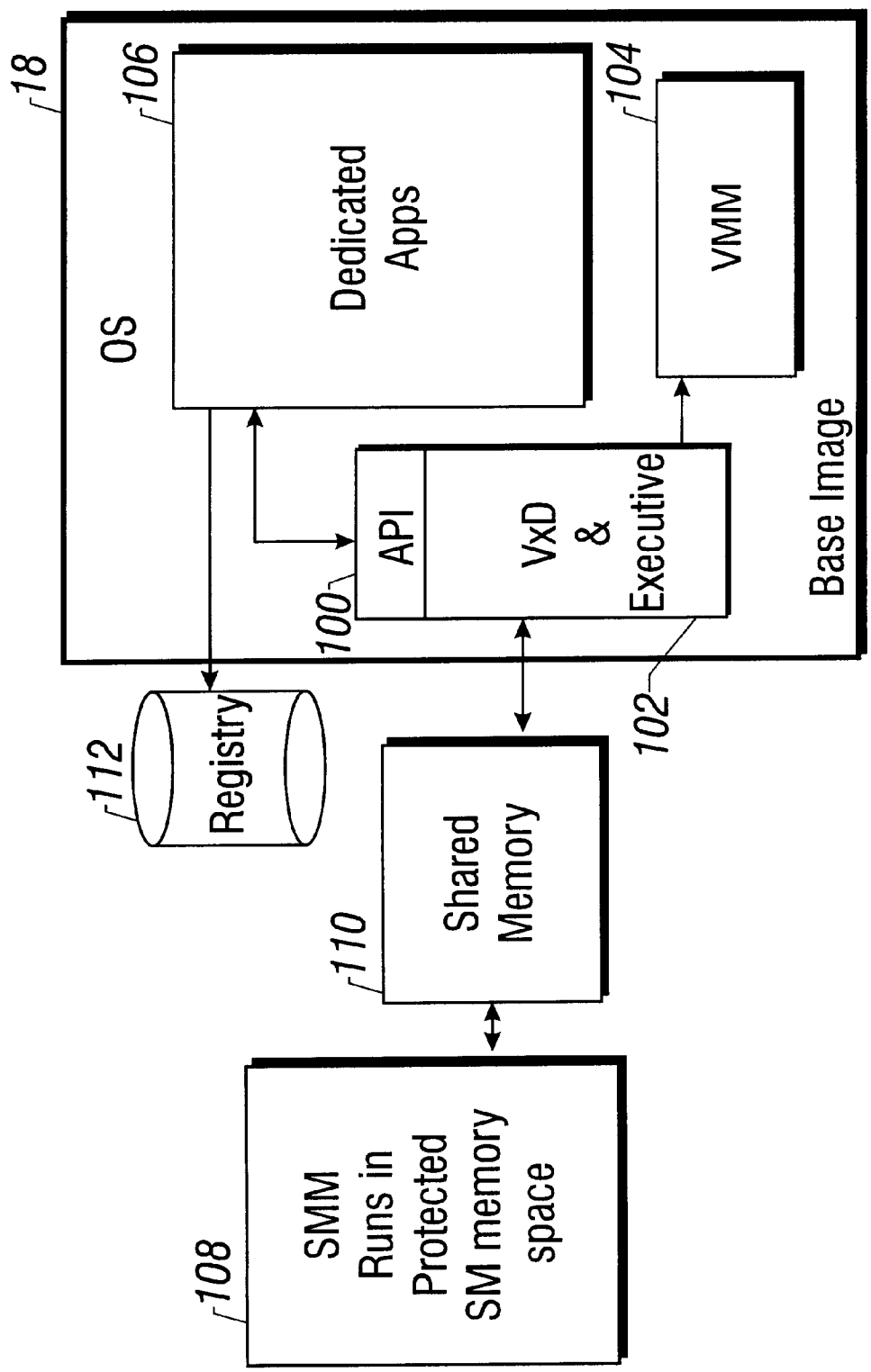
FIG. 4 is a more detailed diagrammatic depiction of the base operating system image shown in FIG. 1.

Referring now to FIG. 4, the base image 18 includes a virtual device driver (VxD) and executive 102, and application program interface (API) 100. The VxD API 100 may, for example, be the device I/O control API provided with the Windows® 32 bit operating systems. The API 100 initiates the VxD 102, causing the VxD 102 to create the base image 18 or the new image 16.

The dedicated applications 106 are critical program applications which advantageously run in a seamless fashion even after a crash. For example, in a set top personal computer, the application programs responsible for digital television function desirably run in a seamless fashion so that if there is a crash, for example, on a Windows® application such as a game, the user would not notice the crash on his or her digital television picture. These dedicated applications 106 may be loaded with the image 16 or 18, the API 100 and the VxD and executive 102.

The virtual machine manager (VMM) 104 is a manager available on 32 bit Windows® operating systems. The VxD 102 can query the VMM 104 for application status information. For example, the VxD 102 can use the VMM 104 to determine if there was a crash. A VMM command can be hooked to determine if a general protection violation or program error indication has been issued, indicating that a crash was detected.

The registry 112 is a status database, such as the Windows® registry. The registry 112 is not part of the image 16 or 18 but it provides the latest information on hardware and software configurations. It is used by the image 18 to bring the system back (after a crash) with all the settings that existed just before the crash. In other words, when the system is restored, the latest settings can be recalled using information obtained by the dedicated applications 106 from the registry 112. For example, in a set top personal computer application, the television channel that was being viewed when the crash occurred can be obtained from the registry 112.

The shared memory 110 allows the base image 18 to communicate with the system management mode (SMM) memory 108. As indicated in FIG. 4, the SMM runs in protected system management memory space. This space exists at ring 0 and is very protected. Therefore, the VxD and the executive 102 may not directly access the SMM memory 108. A shared memory 110 is accessed by the VxD 102. Advantageously, the shared memory 110 may be unknown to the operating system, such as the Windows® operating system. When the shared memory 110 is not mapped to the operating system, the operating system can not access it. However, the VxD 102 can access the memory 110 to allow communications between the system management mode memory 108 and the VxD and executive 102.

Figure 5:
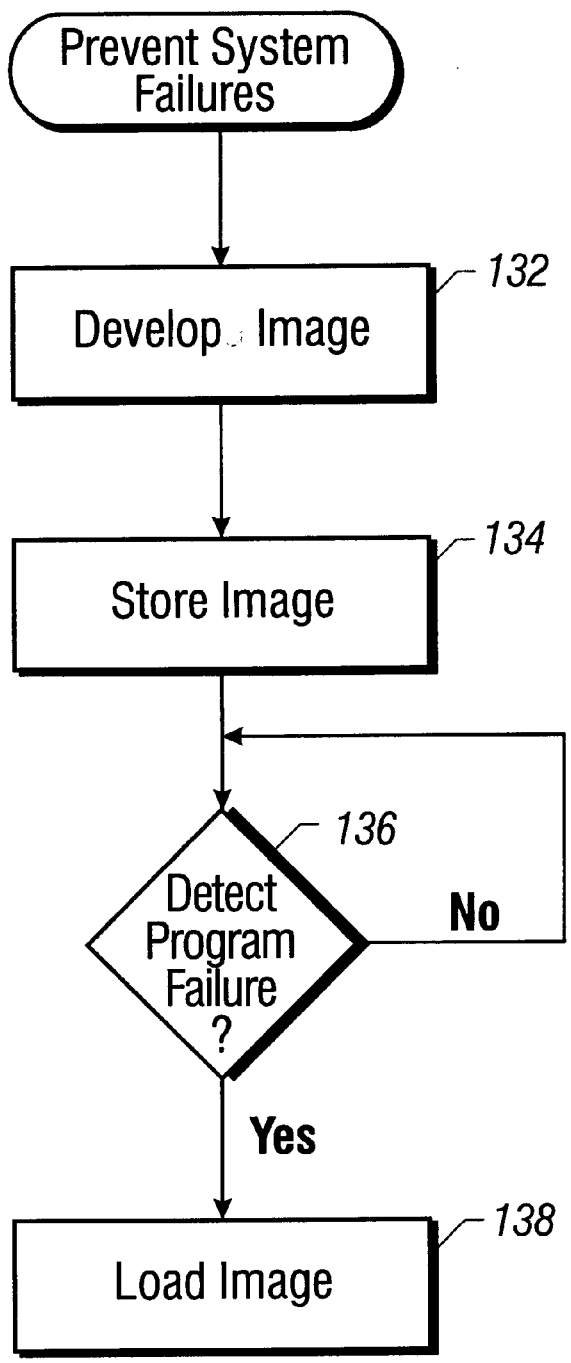
FIG. 5 is a flow diagram for a program to prevent a system failure.

One program for preventing system failure, shown in FIG. 5, begins by developing an image of a base configuration, as indicated in block 132. The image is stored (block 134). When a program failure is detected (diamond 136), the image is loaded (block 138).

Figure 6:
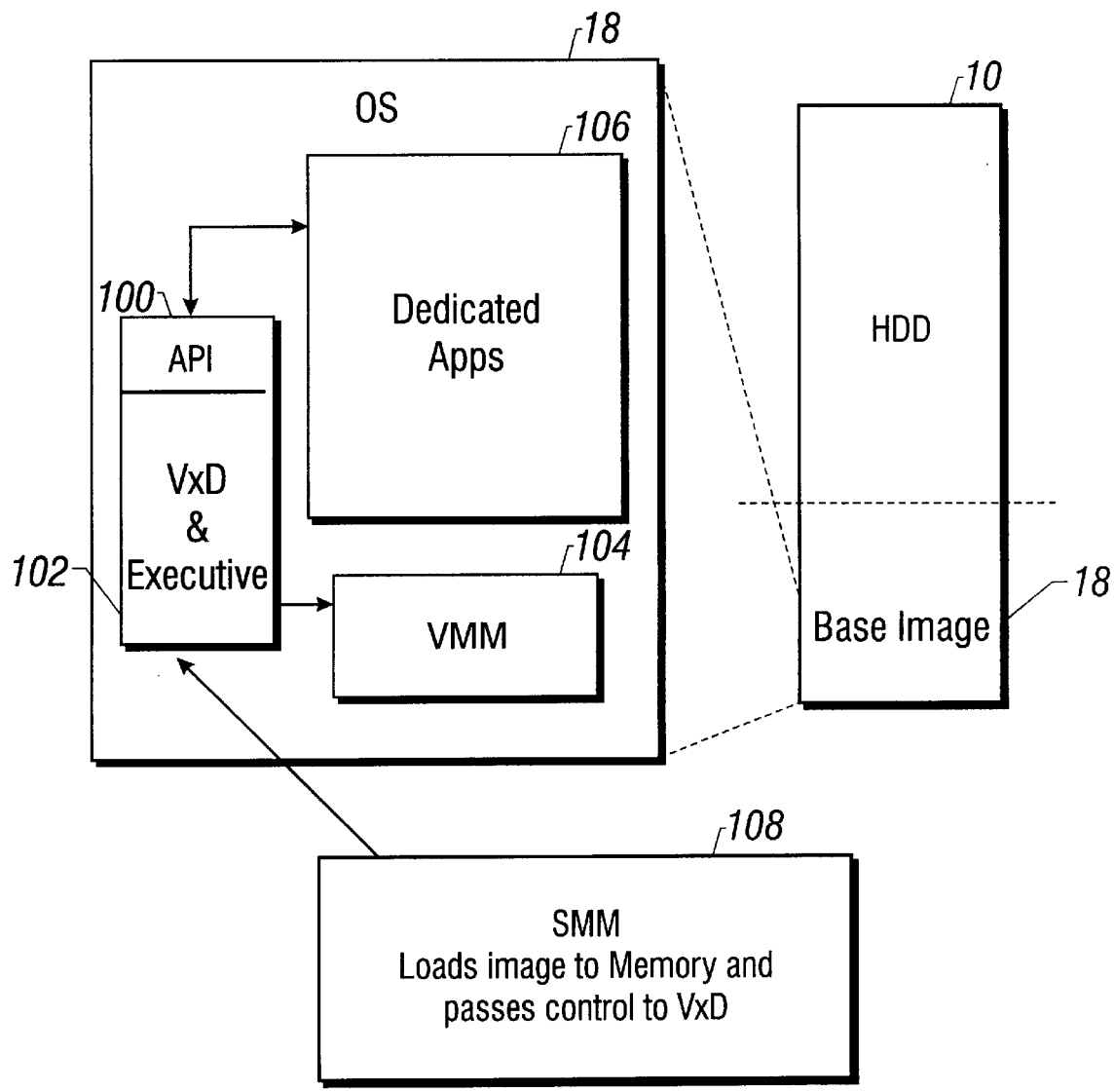
FIG. 6 is a schematic depiction of how the base image is created and utilized.

Referring now to FIG. 6, the image 16 or 18 is created by the executive 102. The VxD and executive 102 are called at a point where the dedicated applications and the user shell are loaded and ready to query the VxD API 100 for a wakeup signal. The image may include the complete memory state of the machine including hardware registers of the processor and devices, together with some system files. The image may be created at the computer manufacturing plant but new images can be created by making the same VxD call, for example, when the system configuration is changed. For example, if a new dedicated application were added, it would be desirable to store a new image.

When it is desired to restore the image for example, after a system crash, the SMM loads the image into system memory 22 and passes control to the VxD 102 as indicated at block 108. The VxD 102 completes the restore and then returns from the entry in the API 100 where it was called. The dedicated applications 106 are then ready for use and allowed to continue to run. They each query the VxD and executive 102 through the API 100, as indicated by the arrows "A", learn that they are awake and retrieve their configuration states. Thus, to the user the dedicated applications appear to run seamlessly, appearing virtually uninterrupted in the same state they were in prior to the crash.

In effect, the VxD is able to supplement or extend the functionalities of the kernel level of the Windows® operating system. Of course this same functionality can also be written into the operating system kernel if one has access to the operating system kernel. By using the VxD, a desired functionality can be added to existing operating system kernels.

Figure 7:
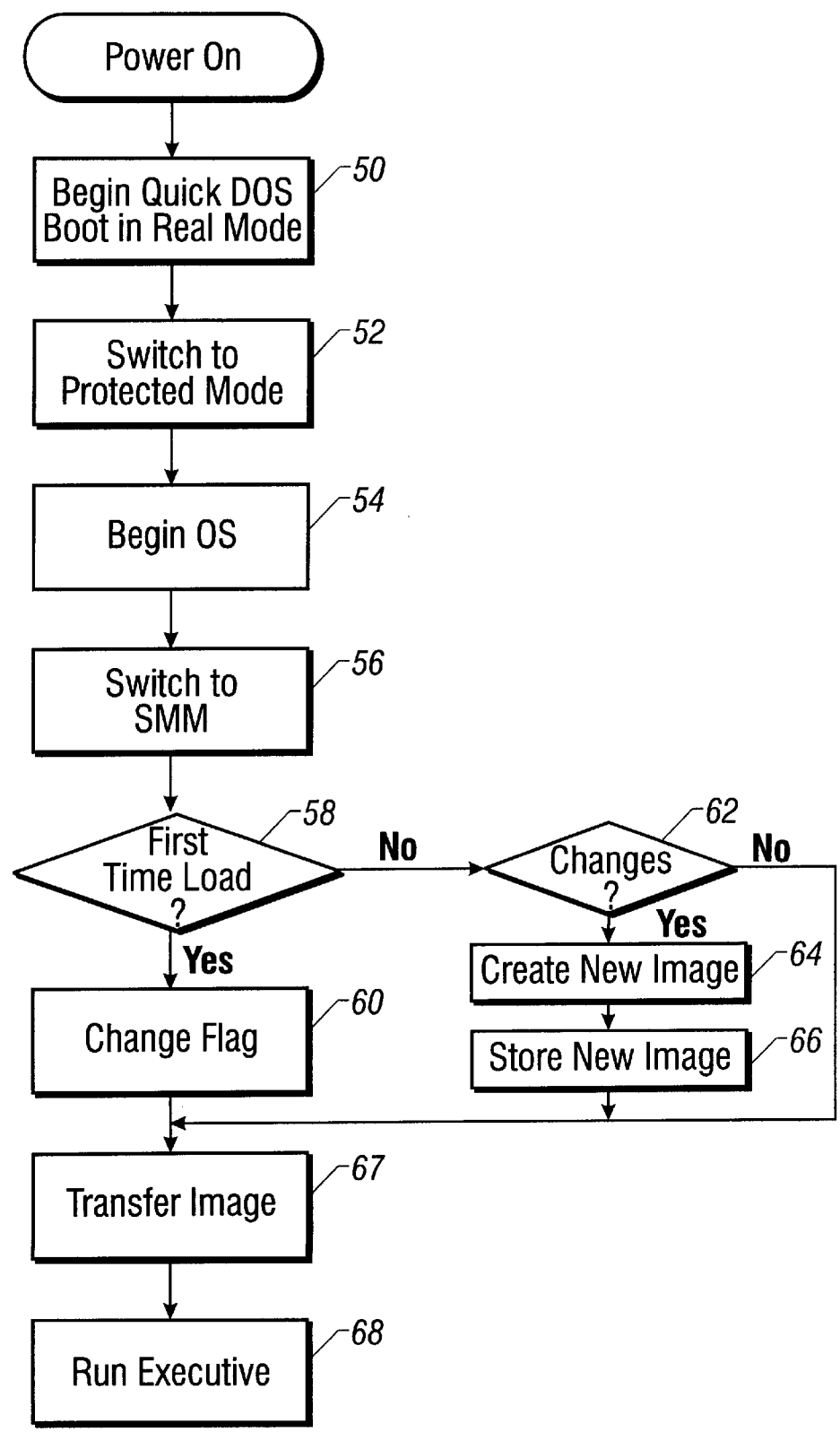
FIG. 7 is a flow diagram showing a initiation of an operating system in accordance with one embodiment of the present invention.

The use of the virtual image in connection with operating system initiation, illustrated in FIG. 7, may begin in certain embodiments, after the DOS (Disk Operating System) bootup has been completed. If desired, an abbreviated DOS bootup sequence may be initiated by removing a variety of operations which are not essential. For example, all or part of the POST routine may be eliminated. As indicated at block 50, the initiation sequence begins with a quick DOS bootup in real mode. At block 52, the bootup sequence switches to the protected mode and the DOS bootup sequence is continued.

At block 54, the operating system initiation sequence begins. Initially, as indicated at step 56, the sequence may switch to the system management mode (SMM). The use of the system management mode may be desirable because it operates in a very protected address space. Moreover, the SMM continues to operate despite a number of relatively serious system errors.

Next, the operating system initiation sequence checks to determine whether this is the first time that the operating system has been initiated, as indicated in diamond 58. If so, a first time load flag is changed so that next time the system will know it is not the first time that the operating system has been initiated (see block 60).

If it is not the first time that the operating system is loaded, a check is undertaken at a configuration database at diamond 62 to determine whether there have been any changes to the computer configuration from the base configuration. One way to implement this function is to set a flag whenever the system reboots. The check at block 62 can then determine whether the flag indicates a reboot has occurred suggesting a new base image should be developed. If the flag is not set, the flow jumps down and the executive 102 is run (block 68). If changes have been made, a new base image is created at 64 and stored at 66. The stored image is then transferred to system memory 22 (block 67) and the executive is run (block 68).

The real time executive 102 does scheduling, loads programs and runs those programs together. It includes some, but not all of the functionalities of a Real Time Operating System (RTOS). An RTOS may also, for example, manage external devices. Thus, an RTOS includes an executive.

The real time executive 102 runs at ring 0 underneath other more visible operations. It is used to allow extension of the operating system kernel which, since it is preprogrammed, may not be amenable (after the fact) to the functionality described herein. However, the executive functionality could be incorporated into the kernel in developing a new operating system. The executive then implements the operating system functionality using the special disk partition 14.

The provision of the virtual image is useful not only at initiation but also in the variety of circumstances which may require restarting of the operating system. The most important is a program error or crash. A crash is a program error caused by hardware or software problems. A program may crash in response to an exception, an infinite loop, a race condition, a resource shortage or a memory violation.

Normally, when an application crashes, the user powers the system down and restarts the system hoping to thereby overcome the problem. Similarly, when the user is unable to deal with a given situation, the user may simply restart the computer system to see if this overcomes the problem. In either case, through the use of the virtual image, it is possible to quickly and efficiently overcome these problems in a seamless way. It is a seamless solution in that the user may have little or no appreciation of what actually happened and may never have to actually take any corrective action.

Figure 8:
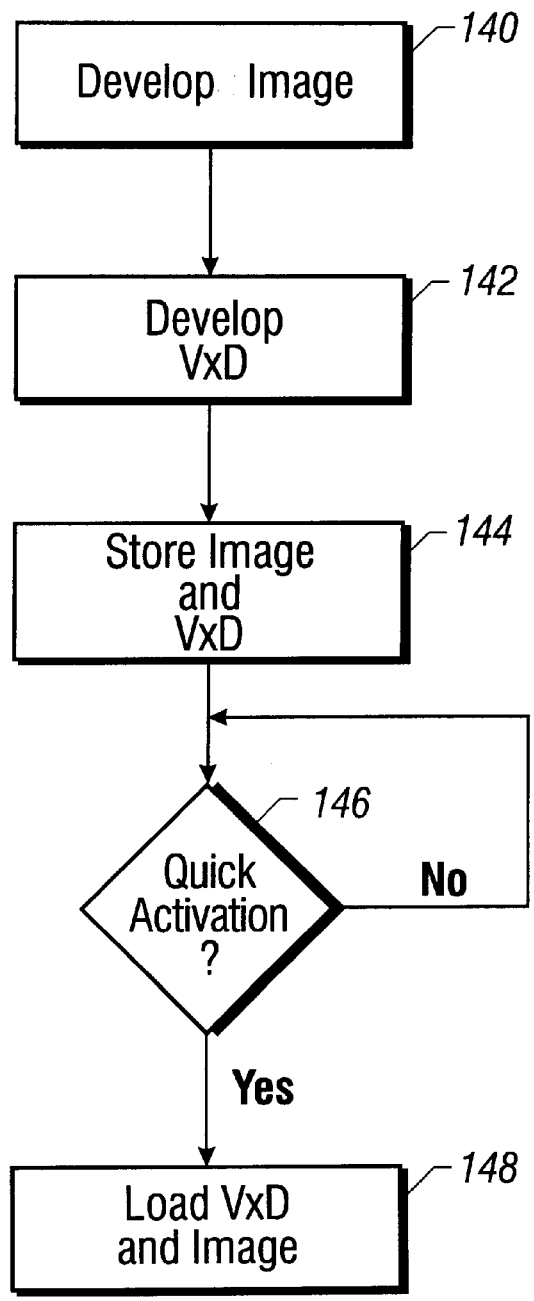
FIG. 8 is a flow diagram of another embodiment corresponding to FIG. 2.

An exemplary software program for implementing the above described program, shown in FIG. 8, includes the step of developing an image of a base system configuration (block 140). Next, a virtual device driver is developed, as indicated in block 142, and the image developed in block 140 and the virtual device driver developed in block 142 are stored, as indicated in block 144. If quick activation is desired, the image and the virtual device driver are loaded, as indicated in blocks 146 and 148.

Figure 9:
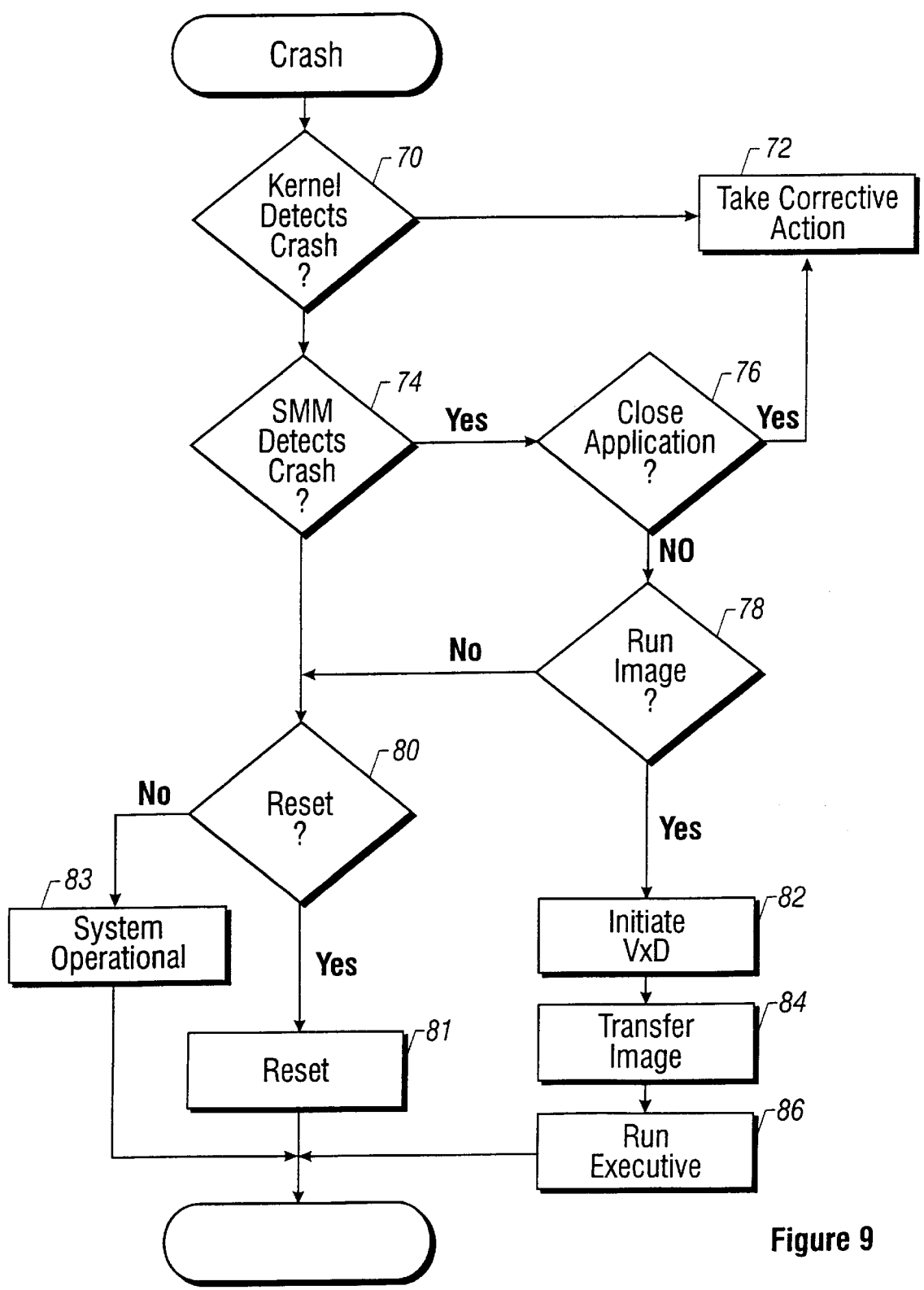
FIG. 9 is a flow diagram showing the operation of one embodiment of the present invention after a program crash.

Referring to FIG. 9, the kernel determines, at diamond 70, whether or not there is a crash. If the kernel is operating and determines that there has been a crash, the kernel can take corrective action, as indicated at block 72. If the kernel is not operating or has not detected the crash, a check is made at diamond 74 to determine whether the system management mode has detected the crash.

The system management mode monitors for a number of different crash circumstances and routinely detects a variety of different failures. Other detectors of system failure can be used as well including those variously described as heart beat monitors, watch dog timers, and crash detectors. In each case the systems detect some symptom of failure such as a hang, a lack of bus operations or some other system associated with a crash.

If a crash is detected at diamond 74, either by the system management mode or some other way, a check is made at diamond 76 to determine whether or not it would be possible to overcome the problem merely by closing the application. If so, the application is merely closed at block 72. The system management mode or other crash detector may have a cache which provides information about different failures which may occur. The cache, which may be stored on the hard disk drive 10, provides information about the best way to deal with those failures. If the failure is one in which the problem can be overcome merely by closing the application, it would normally be desirable to undertake that approach.

If the recorded cache information suggests it is not possible merely to close the application, a check is made at diamond 78 to determine whether or not the executive should be run. Again, the cache is checked to determine whether or not the use of the virtual image will overcome the problem. If not, the flow moves to a reset 80 and the system is reset (block 81) in the conventional fashion unless the system is operational (block 83). If the cache information indicates that the virtual image could be used to overcome the problem, the VxD is initiated, as indicated at block 82. Thereafter, the virtual image is called at block 84 and the executive takes over control at 86. The executive brings the system up using the predefined virtual image, as originally loaded into the system, or as modified as described previously, to accommodate changed system configurations.

Thus, the virtual image of a base or new base image may not only expedite the initiation of the operating system but may also provide a useful tool for crash handling. In addition, in many applications, including the set top personal computer, the virtual image can accommodate normal computer operations in a way which creates a seamless impression to the user. Namely, the user may never notice the time delay involved in initiation or, after most crash circumstances, the user may be effectively shielded from some adverse consequences of the crash. For example, in set top personal computers, the crash may not affect the normal television picture because it is handled quickly.

While the present invention has been described with respect to a limited number of embodiments, those skilled in the art will appreciate numerous modifications and variations. It is intended that the appended claims cover all such modifications and variations that fall within the true spirit and scope of the present invention.

What is claimed is:

1. A method of preventing a system failure comprising:
   developing an image of an operating system adapted to a specific configuration;
   storing the image;
   detecting a program failure; and
   upon detection of a program failure, automatically loading the image into system memory.

2. The method of claim 1 including automatically updating the image to account for modifications to the system configuration.

3. The method of claim 1 including loading said image in a protected mode.

4. The method of claim 3 including loading said image in the system management mode.

5. The method of claim 1 including providing information about how to handle various program failures, and checking said information when a program failure is detected.

6. The method of claim 1 including storing the image of the operating system during the process of manufacturing the computer system.

7. The method of claim 1 including storing a virtual device driver with the image.

8. A method of enabling an operating system to be activated quickly comprising:
   developing an image of the operating system adapted for a specific configuration;
   developing a virtual device driver for operating the image;
   storing the image and the virtual device driver; and
   when it is desired to quickly activate the operating system, loading the virtual device driver and the image into system memory.

9. The method of claim 8 including running an executive.

10. The method of claim 8 including running said virtual device driver in the system management mode.

11. The method of claim 8 including checking for modifications to the system configuration and storing said modifications with said image.

12. The method of claim 11 including using said virtual device driver to check for changes in the system configuration and to store said configuration system changes.

13. A method of enabling quick activation of an operating system comprising:
   developing a first set of configurations for the operating system of a processor-based system;
   storing the first set of configurations;
   automatically recognizing a second set of configurations different from said first set;
   automatically storing information about the second set of configurations;

transferring the information about the second set of configurations to system memory when it is desired to activate the operating system;

operating said processor-based system from said second set of configurations; and booting said operating system while operating said processor-based system using said second set of configurations.

14. The method of claim 13 including transferring the information about the second set of configurations in a protected mode.

15. The method of claim 14 including transferring in the system management mode.

16. The method of claim 13 including implementing new functionality in an existing operating system using an executive.

17. An article comprising a computer readable storage medium storing instructions that cause a computer to:

develop an image of an operating system adapted to a specific configuration;

develop a virtual device driver for operating the image;

store the image and the virtual device driver; and when it is desired to quickly activate the operating system, load the virtual device driver and the image into system memory.

18. An article comprising a computer readable storage medium storing instructions that enable a processor-based system to:

develop a first set of configurations for the operating system of said processor-based system;

store the first set of configurations;

automatically recognize a second set of configurations different from the first set;

automatically store information about the second set of configurations;

transfer the information about the second set of configurations to system memory when it is desired to activate the operating system;

operate said processor-based system from said second set of configurations; and boot said operating system while operating said processor-based system using said second set of configurations.

19. An article comprising a computer readable storage medium storing instructions that cause a computer to:

develop an image of an operating system adapted to a specific configuration;

store the image;

detect a program failure; and upon detection of a program failure, automatically load the image into system memory.

20. A method of preventing a system failure comprising:

developing an image of an operating system adapted to a specific configuration;

running a virtual device driver;

storing the image;

detecting a program failure; and upon detection of a program failure, transferring said image to the system memory and running an executive to take control from the kernel.

21. The method of enabling quick activation of an operating system comprising:

developing a first set of configurations for the operating system;

storing the first set of configurations;

automatically recognizing a second set of configurations different from said first set;

automatically storing information about the second set of configurations;

transferring information about the second set of configurations to said system memory when it is desired to activate the operating system; and using a virtual device driver to check for changes in system configuration, to locate the configuration settings and to store those settings.

* * * * *